United States Patent [19]

Faulkner et al.

[11] Patent Number: 4,554,481
[45] Date of Patent: Nov. 19, 1985

[54] ELECTRON DISCHARGE DEVICE HAVING A CERAMIC MEMBER WITH MEANS FOR REDUCING LUMINESCENCE THEREIN

[75] Inventors: Richard D. Faulkner; James L. Rhoads, both of Lancaster, Pa.

[73] Assignee: RCA Corporation, Princeton, N.J.

[21] Appl. No.: 546,536

[22] Filed: Oct. 28, 1983

[51] Int. Cl.[4] .................. H01J 31/48; H01J 43/28
[52] U.S. Cl. ................... 313/533; 313/541; 313/544
[58] Field of Search ............. 313/533, 532, 544, 541, 313/635, 636

[56] References Cited

U.S. PATENT DOCUMENTS

| | | | |
|---|---|---|---|
| Re. 23,556 | 9/1952 | Mochel | 201/73 |
| 2,545,120 | 3/1951 | Swedlund | 250/141 |
| 3,114,044 | 12/1963 | Sternglass | 250/207 |
| 3,227,581 | 1/1966 | Zumaquero | 117/227 |
| 3,290,171 | 12/1966 | Zollman et al. | 117/160 |
| 3,909,655 | 9/1975 | Grimmett et al. | 313/450 |
| 3,979,632 | 9/1976 | Gunning et al. | 313/479 |
| 3,988,628 | 10/1976 | Clausen | 313/635 X |
| 4,001,618 | 1/1977 | Kaseman | 313/94 |
| 4,350,925 | 9/1982 | Marschka | 313/451 |
| 4,370,586 | 1/1983 | Fitts | 313/102 |
| 4,376,246 | 3/1983 | Butterwick | 250/207 |
| 4,407,857 | 10/1983 | Butterwick | 427/74 |

OTHER PUBLICATIONS

H. R. Krall, "Extraneous Light Emission from Photomultipliers", *IEEE Trans. Nucl. Sci.*, vol. NS-14, No. 1, pp. 455-459 (Feb. 1967).

Primary Examiner—Palmer C. DeMeo
Attorney, Agent, or Firm—Eugene M. Whitacre; Dennis H. Irlbeck; Vincent J. Coughlin, Jr.

[57] ABSTRACT

An improved electron discharge device comprises an evacuated envelope having at least one alumina ceramic insulator member. Within the device is a source of electrons, and an electron multiplier assembly including an anode. A high resistance material is diffused into the ceramic insulator to reduce luminescence within the insulator. The method of diffusion includes the steps of applying an opaque coating of a high resistance material to a surface of the ceramic insulator member and then firing the member in a reducing atmosphere at a temperature within the range of about 1500° C. to 1550° C. until the high resistance material diffuses into the surface of the member forming a diffusion region.

3 Claims, 2 Drawing Figures

ELECTRON DISCHARGE DEVICE HAVING A CERAMIC MEMBER WITH MEANS FOR REDUCING LUMINESCENCE THEREIN

BACKGROUND OF THE INVENTION

The invention relates to electron discharge devices and particularly to photomultiplier tubes having ceramic-metal envelopes.

In U.S. Pat. Nos. 4,376,246 and 4,407,857 issued to G. N. Butterwick on Mar. 8, 1983 and on Oct. 4, 1983, respectively, photomultiplier tubes having ceramic-metal envelopes are described. The Butterwick patents are incorporated by reference herein for disclosure purposes. Ceramic-metal envelopes are sturdier than conventional glass envelopes and are preferred where harsh environmental conditions are encountered. The ceramic insulators used in the envelopes of the photomultiplier tubes described in the above-referenced Butterwick patents comprise a high alumina ($Al_2O_3$) ceramic having an alumina content of about 95 percent.

A drawback in using a ceramic insulator in a photomultiplier tube is that the ceramic insulator exhibits electric field induced luminescence. This phenomenon is described in copending U.S. patent application Ser. No. 172,659 filed by McDonie et al. on July 28, 1980, assigned to the assignee of the present invention and incorporated by reference herein for disclosure purpose. In the above-referenced McDonie et al. application, the ceramic insulating support spacers, which support the dynodes and the anode, luminesce in the vicinity of the anode. A coating of high resistance chrome oxide ($Cr_2O_3$) with an overlayer of lower resistance Nichrome eliminates the luminescence in the dynode support spacers. However, such a solution is not feasible where the ceramic member comprises a portion of the tube envelope, since the envelope ceramic member must retain its high resistance characteristic and the lower resistance Nichrome overlayer cannot be used.

In the photomultiplier tubes described in the Butterwick patents, referenced above, it has been determined that the ceramic insulator member separating the cathode and stem subassemblies luminesces because of the proximity of the ceramic member to the electron multiplier cage assembly which operates at a maximum voltage of 1800 volts with respect to the cathode.

In an attempt to "quench" this luminescence while retaining the high resistance of the envelope ceramic insulator member, a conventional chrome oxide coating was applied to the ceramic member. The chrome oxide coating was applied as described in the above-referenced McDonie et al. patent application. The interior surface of the ceramic member was sprayed with chrome oxide suspended in a silicate binder. The coated ceramic member was then fired in a water saturated hydrogen atmosphere at 1000° C. for 10 to 15 minutes to cure the chrome oxide. The chrome oxide coated ceramic member was then used to make a ceramic-metal envelope for a tube. Unfortunately, it proved nearly impossible to controllably form a photoemissive cathode on the faceplate of the tube having the chrome oxide coated ceramic member in the ceramic-metal envelope. It is believed that the chrome oxide absorbs large quantities of the alkali metal vapors used to form the photoemissive cathode. The alkali metals significantly reduce the electrical resistance across the ceramic member so that electrical leakage masks the developing sensitivity of the photoemissive cathode. As a result, reproducible photocathodes cannot be made consistently in tubes having ceramic-metal envelopes with a conventional chrome oxide coating disposed on the interior surface of the ceramic member.

SUMMARY OF THE INVENTION

An improved electron discharge device comprises an evacuated envelope having at least one alumina ceramic insulator member. The device includes, within the envelope, a source of electrons, an anode and means for propagating electron emission from said source to said anode. The device further includes a high resistance material diffused into said ceramic insulator member for reducing luminescence within said member.

DETAILED DESCRIPTION OF THE PREFERRED EMBODIMENT

Figure 1:
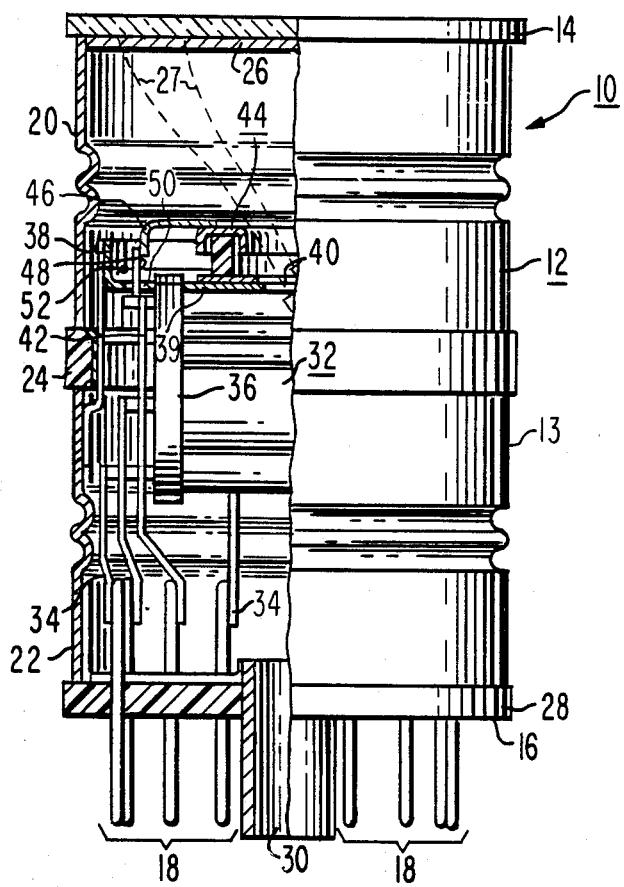
FIG. 1 is an enlarged view, partially in section, of a photomultiplier tube embodying the present invention.

Referring to the drawings, there is shown in FIG. 1, a photomultiplier tube 10 comprising an evacuated envelope 12 having a generally cylindrical sidewall 13, a transparent faceplate 14 and a stem section 16 through which a plurality of support leads 18 are sealed. The envelope 12 includes a cathode subassembly 20 and a stem subassembly 22. The cathode subassembly 20 is separated from the stem subassembly 22 by a novel ceramic-insulator member 24 brazed between the cathode and stem subassemblies. A photoemissive cathode (hereinafter called the photocathode) 26 is formed on the interior surface of the faceplate 14. The photocathode 26 provides photoelectrons in response to radiation incident thereon. The photoelectrons follow paths 27 into an electron multiplier assembly described below. The faceplate 14 is shown to be a plano-plano window, for example of sapphire or other suitable materials although sapphire is preferred. The sapphire faceplate 14 provides a reasonable cost, nonreactive substrate on which to form the photocathode 26. The stem 16 is a ceramic-metal structure comprising a ceramic base 28 and a metal tubulation 30. The metal tubulation 30 is preferably made of a copper alloy which may be cold-welded subsequent to photocathode formation to form a vacuum seal. The tubulation 30 is brazed to the ceramic plate 28 by a method well known in the art. The leads 18 extend through the ceramic plate 28 and are vacuum sealed thereto, e.g., by brazing. An electron multiplier cage assembly, indicated generally as 32, is supported within the envelope 12 by a plurality of cage leads 34 (only some of which are shown). The cage leads 34 are attached at one end to the internally projecting leads 18. The cage assembly 32 comprises a plurality of dynodes supported between a pair of dynode support spacers 36, only one of which is shown. The dynodes comprise secondary emissive electrodes for propagating and concatenating electron emission from the photocathode 26 to an anode (not shown) enclosed within the last dynode. For high temperature operation, dynodes formed from a beryllium copper alloy and having a beryllium-oxide secondary emissive surface are preferred; although nickel dynodes having an alkali antimonide secondary emissive surface may be used at lower operating temperatures.

The dynode support spacers 36 are attached to a support electrode 38 which is spaced from the faceplate 14. The support electrode 38 is preferably a cup-shaped conductive member having a substantially flat base 39 and a centrally disposed aperture 40 extending therethrough. Electrical connection between the envelope wall 12 and the support electrode 38 is provided by a connecting strap 42. A focusing electrode assembly 44 is disposed substantially concentrically about the centrally located aperture 40 of the support electrode 38 on a side of the support electrode 38 opposite the electron multiplier assembly 32. A connecting lead 46 is attached at one end to the focusing assembly 44 and at the other end to a stand-off electrode 48 extending through a ceramic feedthrough 50 which is located in the flat base 39 of the support electrode 38. Operating potentials for the photocathode 26, the electron multiplier assembly 32 and the focus assembly 44 are provided over the leads 18.

An antimony evaporator 52 is disposed within the support electrode 38 in order to form the photocathode 26 on the faceplate 14. Preferably, two antimony evaporators 52, oppositely disposed within the support electrode, are used to uniformly evaporate an antimony film on the faceplate 14. As is well known in the art, the antimony film reacts with alkali vapors from alkali generators (not shown) to form the photocathode 26.

Figure 2:
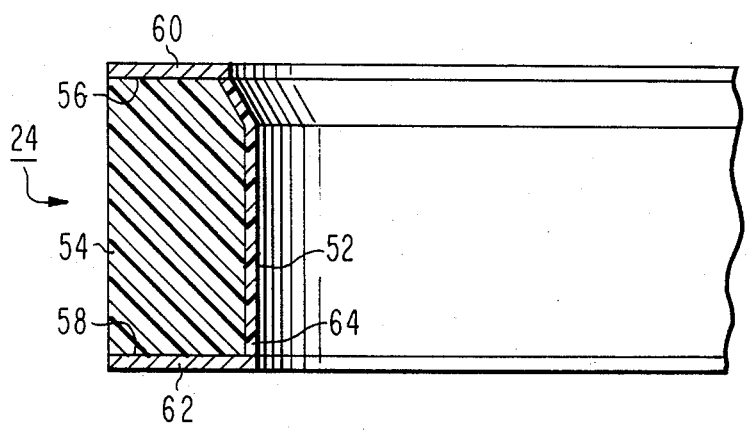
FIG. 2 is an enlarged sectional view of a fragment of a ceramic insulator member used in the tube of FIG. 1.

The novel ceramic insulator member 24 has an alumina content of about 95 percent. As shown in FIG. 2, the member 24 has an annular configuration with an inner surface 52, an outer surface 54 and substantially flat, parallel upper and lower surfaces 56 and 58, respectively. A metallizing layer 60 is formed on the upper surface 56 and a similar metallizing layer 62 is formed on the lower surface 58. The metallization method is described in U.S. Pat. No. 3,290,171 issued to Zollman et al. on Dec. 6, 1966, which is incorporated by reference herein for the purpose of disclosure. In order to eliminate or at least reduce the luminescence within the ceramic member 24 caused by the electric field induced by the potentials on the electron multiplier assembly 32, a uniform opaque chrome oxide coating is disposed on the interior surface 52 of the member 24. The coating comprises chrome oxide particles suspended in a binder of sodium silicate. The materials and method of application are conventional to this point. In the prior art it is known to fire the coated ceramic member at a temperature of about 1000° C. in a water saturated hydrogen atmosphere for about 10 to 15 minutes. The firing removes excess water from the suspension and the silicate permits the chrome oxide to be bound to the inner surface of the ceramic member.

The novel method requires that the chrome oxide coated ceramic member 24 be fired in a water saturated 10 percent forming gas (90 percent $N_2$ and 10 percent $H_2$) atmosphere for about 1 hour at a temperature ranging from 1500° to 1550° C. The firing in forming gas at a higher temperature and for a longer time than the conventional firing procedure described herein has the unexpected result of causing the silicate of the binder and the chrome oxide to diffuse into the inner surface 52 of the ceramic member 24 to form a diffusion region 64 extending into the alumina ceramic for a distance of about 0.075 mm (3 mils). The diffusion region 64 has a resistivity substantially identical to the unprocessed alumina ceramic member (about $10^{14}$ to $10^{15}$ ohm/cm$^3$ at room temperature). Furthermore, the diffusion region 64, unlike a conventional chrome oxide coating, does not change resistance in the present of the alkali metal vapor used to form the photocathode 26.

In tests performed on photomultiplier tubes made with untreated ceramic members 24, only 10 percent of the tubes tested for dark current at an operating voltage of 1500 volts between the cathode and anode met the anode dark current specification of not more than 10 nanoamperes. In contrast, 98 percent of the tubes having a chrome oxide diffusion region 64 formed as described herein met the dark current specification of not more than 10 nanoamperes of anode dark current at an operating voltage of 1500 volts.

What is claimed is:

1. In an electron discharge device comprising an evacuated envelope including at least one alumina ceramic insulator member,
    a source of electrons within said envelope,
    an anode spaced from said source of electrons, and
    means for propagating and concatenating electron emission from said source to said anode,
    the improvement wherein said ceramic insulator member includes means for reducing luminescence therein, said means comprising an opaque high resistance material diffused into said ceramic insulator member.

2. The device as in claim 1 wherein said opaque high resistance material comprises chrome oxide.

3. In a photomultiplier tube comprising an evacuated envelope including at least one alumina ceramic insulator member having an interior surface,
    a faceplate closing one end of said envelope, said faceplate having an interior surface,
    a photocathode on said interior surface of said faceplate, said photocathode providing photoelectrons in response to radiation incident thereon,
    an anode spaced from said photocathode,
    a plurality of dynodes disposed between said photocathode and said anode for propagating and concatenating electrons therebetween,
    the improvement wherein said ceramic insulator member includes a diffusion region comprising chrome oxide extending into said member for a distance of about 0.075 mm from the interior surface thereof, thereby reducing luminescence within said member.

* * * * *